Gurley & Brady,
Camp Bed,

Nº 33,192. Patented Sep. 3, 1861.

Witnesses;

Inventors;
George B. Gurley
Oliver E. Brady

UNITED STATES PATENT OFFICE.

GEORGE B. GURLEY AND OLIVER G. BRADY, OF NEW YORK, N. Y.

IMPROVED COT, LOUNGE, AND CHAIR.

Specification forming part of Letters Patent No. 33,192, dated September 3, 1861.

*To all whom it may concern:*

Be it known that we, GEORGE B. GURLEY and OLIVER G. BRADY, both of the city, county, and State of New York, have invented a new and useful Combination of a Cot, Lounge, and Chair, designed more especially for army or camp use; and we do hereby declare that the following is a full, clear, and exact description of the same, reference being had to the annexed drawings, making a part of this specification, in which—

Figure 1:
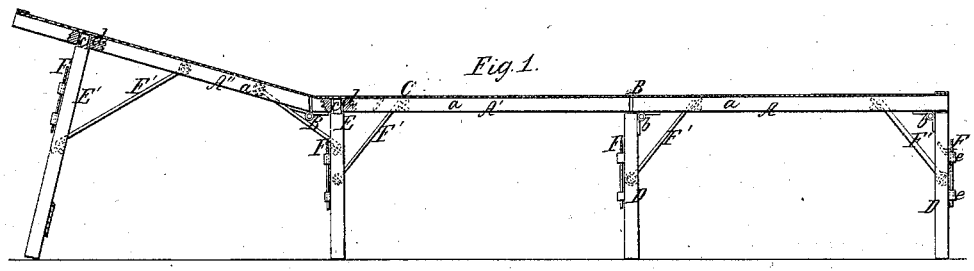
Figures 2, 5:
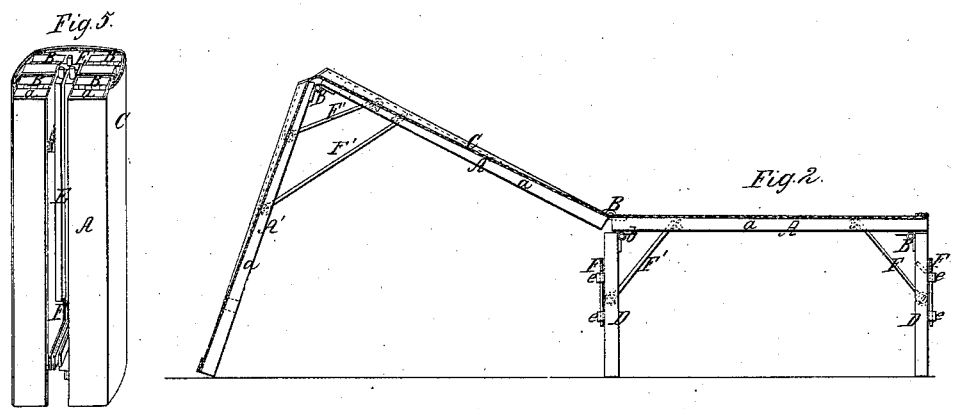
Figure 3:
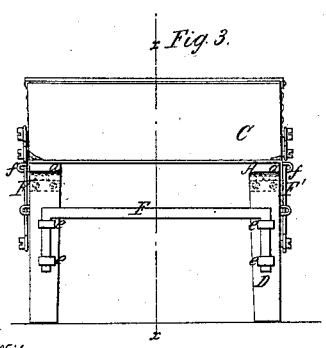
Figure 4:
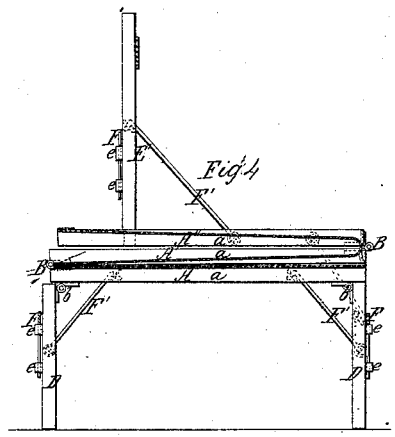

Figure 1 is a longitudinal vertical section of our invention, taken in the line $x\,x$, Fig. 3, and shown adjusted as a cot; Fig. 2, a longitudinal vertical section of the same adjusted as a lounge; Fig. 3, an end view of Fig. 1; Fig. 4, a vertical central section of our invention adjusted as a chair; Fig. 5, a view of the invention in a folded state.

Similar letters of reference indicate corresponding parts in the several figures.

The object of this invention is to combine a cot, lounge, and chair in such a way that the device may be used in any one of the capacities above named and serve equally as well as if made separately for any one of them, and be capable of being folded very compactly for transportation when required.

To enable those skilled in the art to fully understand and construct my invention, I will proceed to describe it.

A A' A'' represent three frames, each of which is formed of two parallel bars $a\,a$, connected by hinges or joints B, and having a suitable canvas C attached to them to serve as a sacking bottom. The frame A has two pairs of legs D permanently attached to it by hinges or joints $b$, while the frames A' A'' have legs E E' temporarily attached by tenons $c$, fitting in holes $d$ in the bars $a\,a$ of said frames, as shown clearly in Fig. 1. Each pair of legs D E E' is connected by a cross-bar F, the ends of which are bent at right angles to the main part and are fitted in loops or eyes $e$, as shown clearly in Fig. 3.

Each pair of legs D E E' is provided with hooks F', a hook being attached to each leg and serving as braces by catching into staples $f$ in the bars $a$ of the frames, as shown clearly in Figs. 1, 2, and 4.

When the device is used as a cot, the legs E E' are fitted in their respective frames A' A'', and the hooks F' thereof are fitted in their proper staples. The legs E' are rather longer than the legs E, and consequently the frame A'' has an inclined position, as shown in Fig. 1, and serves to keep the head of the occupant in an elevated state.

When the device is used as a lounge, the legs E E' are removed from the frames A' A'', and the frame A'' serves as a support for the frame A', supporting the latter in an inclined state, as shown clearly in Fig. 2, the braces, the hooks F' of frame A'', being fitted in staples in the frame A', as shown in Fig. 2.

When the device is to be used as a seat, the frame A'' is folded underneath the frame A', and the frame A' is folded upon the frame A. The legs E' are then fitted in the upper side of frame A'' and braced by the hooks F' thereof, as shown in Fig. 4.

In cases of transportation or when the device is not required for use the legs E E' are detached from the frames A' A'' and the legs D are folded beneath their frame A, and the frames A A' A'' folded together, as shown in Fig. 5, the removable legs E E' being in the fold, their bars F being removed in order to admit of such result. Thus it will be seen that a simple and portable combined cot, lounge, and chair is obtained, and that the device may be cheaply constructed and in a durable manner.

Having thus described our invention, what we claim as new, and desire to secure by Letters Patent, is—

The frames A A' A'', formed of parallel bars $a\,a$, with canvas C attached, and connected by hinges or joints B, in connection with the stationary legs D and removable legs E E', connected by bars F and braced by hooks F', all being combined and arranged to form a new and useful combination of a cot, lounge, and chair, substantially as set forth.

GEORGE B. GURLEY.
OLIVER G. BRADY.

Witnesses:
M. M. LIVINGSTON,
JAMES LAIRD.